(12) United States Patent
Suganuma et al.

(10) Patent No.: US 8,615,342 B2
(45) Date of Patent: Dec. 24, 2013

(54) HYBRID VEHICLE AND METHOD OF CONTROLLING HYBRID VEHICLE

(75) Inventors: Hideaki Suganuma, Yokohama (JP); Mamoru Kuraishi, Ome (JP); Kazunao Yamada, Toyota (JP); Takashi Naitou, Okazaki (JP); Toshiaki Niwa, Okazaki (JP); Masatoshi Takahara, Okazaki (JP); Fumiharu Ogawa, Okazaki (JP)

(73) Assignees: Toyota Jidosha Kabushiki Kaisha, Toyota-shi (JP); Denso Corporation, Kariya-shi (JP); Aisin AW Co., Ltd., Anjo-shi (JP)

( * ) Notice: Subject to any disclaimer, the term of this patent is extended or adjusted under 35 U.S.C. 154(b) by 209 days.

(21) Appl. No.: 13/130,464

(22) PCT Filed: Nov. 19, 2009

(86) PCT No.: PCT/IB2009/007501
§ 371 (c)(1),
(2), (4) Date: Jul. 26, 2011

(87) PCT Pub. No.: WO2010/058267
PCT Pub. Date: May 27, 2010

(65) Prior Publication Data
US 2011/0276209 A1 Nov. 10, 2011

(30) Foreign Application Priority Data
Nov. 20, 2008 (JP) .................................. 2008-297194

(51) Int. Cl.
*B60L 9/00* (2006.01)

(52) U.S. Cl.
USPC ...... 701/22; 903/903; 180/65.265; 180/65.29

(58) Field of Classification Search
USPC .......... 701/22, 25, 36, 65; 180/65.265, 65.29, 180/65.51; 903/903
See application file for complete search history.

(56) References Cited

U.S. PATENT DOCUMENTS

| 6,314,347 | B1 | 11/2001 | Kuroda et al. | |
|---|---|---|---|---|
| 2002/0143441 | A1 | 10/2002 | Yamaguchi et al. | |
| 2003/0009269 | A1 | 1/2003 | Graf et al. | |
| 2003/0230443 | A1* | 12/2003 | Cramer et al. | 180/65.5 |
| 2007/0205881 | A1* | 9/2007 | Breed | 340/447 |

FOREIGN PATENT DOCUMENTS

| DE | 19937381 | 3/2001 |
|---|---|---|
| EP | 1975028 | 10/2008 |

(Continued)

*Primary Examiner* — Gertrude Arthur Jeanglaude
(74) *Attorney, Agent, or Firm* — Gifford, Krass, Sprinkle, Anderson & Citkowski, P.C.

(57) ABSTRACT

A hybrid vehicle includes a road condition acquisition portion (40, 41) that acquires information on an actual road condition; a storage portion (42) where road data is stored; a route setting portion (40) that sets a route to a destination, based on the road data stored in the storage portion (42); a travel pattern setting portion (30) that sets a travel pattern on the route set by the route setting portion (40), based on the road data stored in the storage portion (42); an operation schedule setting portion (30) that sets an operation schedule that is a schedule of operations of the engine and the motor, based on the travel pattern set by the travel pattern setting portion (30); and a control portion (30) that controls the operations of the engine and the motor based on the information on the actual road condition acquired by the road condition acquisition portion (40, 41) and the operation schedule set by the operation schedule setting portion (30).

10 Claims, 5 Drawing Sheets

(56) References Cited

FOREIGN PATENT DOCUMENTS

| | | |
|---|---|---|
| JP | 10184413 A | 7/1998 |
| JP | 2001183150 A | 7/2001 |
| JP | 2004101245 A | 4/2004 |
| JP | 2004248455 | 9/2004 |
| JP | 2007050888 | 3/2007 |
| JP | 2008087719 | 4/2008 |
| JP | 2008247318 A | 10/2008 |
| WO | WO-2006135868 | 12/2006 |

* cited by examiner

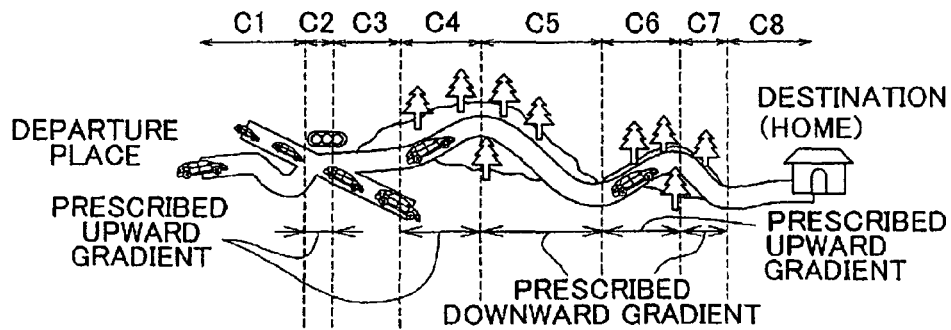
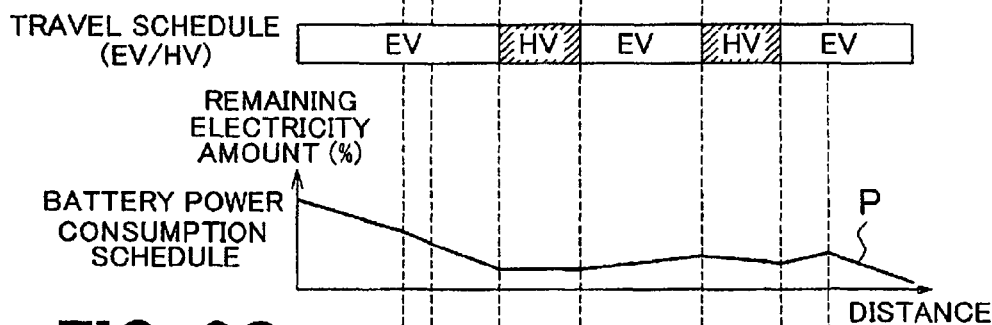
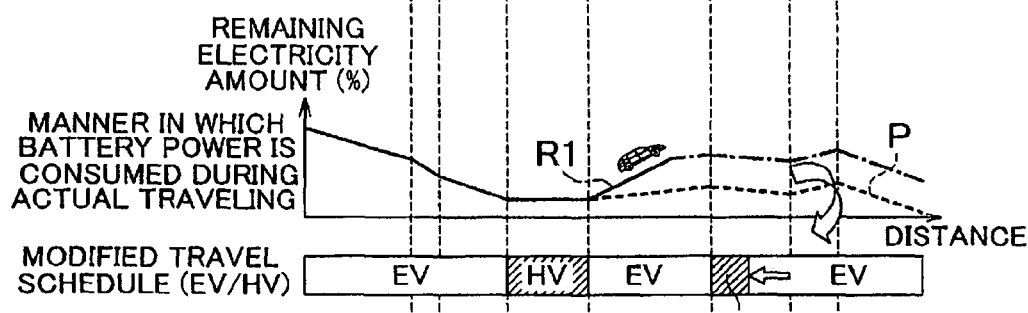
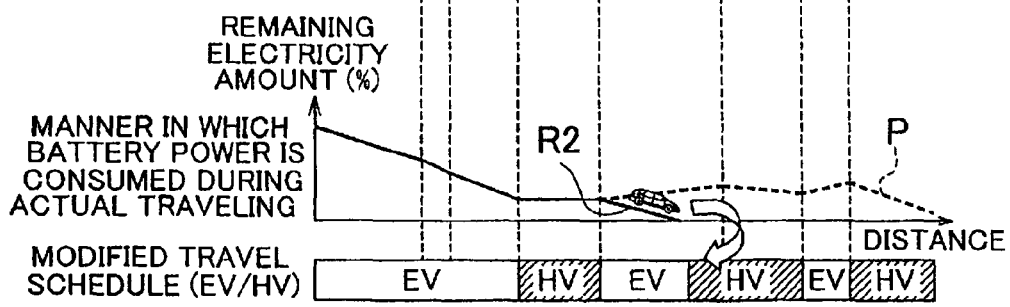

HYBRID VEHICLE AND METHOD OF CONTROLLING HYBRID VEHICLE

CROSS-REFERENCE TO RELATED APPLICATIONS

This application is the U.S. National Phase of PCT/IB2009/007501 filed Nov. 19, 2009, which claims priority of Japanese Patent Application JP 2008-297194 filed Nov. 20, 2008, both of which are herein incorporated by reference.

BACKGROUND OF THE INVENTION

1. Field of the Invention

The invention relates to a hybrid vehicle that includes an engine and a motor that generate drive power for driving the hybrid vehicle, and a method of controlling the hybrid vehicle.

2. Description of the Related Art

In a hybrid vehicle, importance is placed on fuel efficiency. Therefore, the ratio between drive power generated by an engine and drive power generated by a motor needs to be changed, or a travel mode needs to be switched between a hybrid vehicle travel mode and an electric vehicle travel mode, in order to efficiently consume available electricity in a battery. Particularly in a plug-in hybrid vehicle in which a battery is charged with electricity supplied from an external power source (for example, a power source for domestic use), it is preferable that the available electricity in the battery should be used up when the hybrid vehicle reaches a destination (i.e., a point at which the battery can be charged). In a hybrid vehicle described in Japanese Patent Application Publication No. 2008-87719 (JP-A-2008-87719), a coordinated control is executed using a navigation system. Required amount of electricity is determined based on map data (for example, a gradient) relating to a route to the destination, and the amount of electricity to be consumed is estimated. Thus, a travel mode is switched between a hybrid vehicle travel mode and an electric vehicle travel mode so that available electricity in a battery is consumed as much as possible until the hybrid vehicle reaches the destination.

In the above-described hybrid vehicle, the travel mode is switched between the hybrid vehicle travel mode and the electric vehicle travel mode based on gradient information in the map data. Therefore, the travel mode may be switched between the hybrid vehicle travel mode and the electric vehicle travel mode at a point different from an actual gradient change point at which the actual gradient changes, depending on accuracy of the gradient change point in the map data, and accuracy of detecting a current position of the vehicle. In this case, drive power changes due to the switching of the travel mode between the hybrid vehicle travel mode and the electric vehicle travel mode, when the hybrid vehicle is not located at the actual gradient change point. Accordingly, an occupant feels discomfort. For example, in the case where a flat road leads to a steep upward gradient, if the travel mode is switched from the electric vehicle travel mode to the hybrid vehicle travel mode before the hybrid vehicle reaches the actual gradient change point, the occupant feels discomfort due to an increase in the drive power, and if the travel mode is switched from the electric vehicle travel mode to the hybrid vehicle travel mode after the hybrid vehicle passes the actual gradient change point, the occupant feels discomfort due to insufficiency of the drive power.

SUMMARY OF THE INVENTION

The invention provides a hybrid vehicle and a method of controlling a hybrid vehicle, which reduce the possibility that an occupant feels discomfort due to changes in operating states of an engine and a motor.

A first aspect of the invention relates to a hybrid vehicle that includes an engine and a motor that generate drive power for driving the hybrid vehicle. The hybrid vehicle includes a road condition acquisition portion which is installed in the hybrid vehicle, and which acquires information on an actual road condition; a storage portion in which road data is stored; a route setting portion that sets a route to a destination, based on the road data stored in the storage portion; a travel pattern setting portion that sets a travel pattern on the route set by the route setting portion, based on the road data stored in the storage portion; an operation schedule setting portion that sets an operation schedule that is a schedule of operations of the engine and the motor, based on the travel pattern set by the travel pattern setting portion; and a control portion that controls the operations of the engine and the motor based on the information on the actual road condition acquired by the road condition acquisition portion and the operation schedule set by the operation schedule setting portion.

In the hybrid vehicle, when the destination is set, the route setting portion sets the route to the destination based on the map data. In the hybrid vehicle, when the route is set, the travel pattern setting portion sets the travel pattern on the route to the destination, based on the map data. The travel pattern is set so that the operating states of the engine and the motor are changed according to a road condition. For example, the travel pattern may be set based on road gradient data. Further, in the hybrid vehicle, the operation schedule setting portion sets the operation schedule that is a schedule of the operating states of the engine and the motor on the route up to the destination, based on the travel pattern. When the hybrid vehicle is traveling, the road condition acquisition portion acquires the information on the actual road condition, and the control portion controls the operations of the engine and the motor based on the set operation schedule and the information on the actual road condition. Thus, in the hybrid vehicle, the operating states of the engine and the motor are changed while the operation schedule set based on the map data is compared with the actual road condition. Therefore, it is possible to change the operating states of the engine and the motor according to the actual road condition. Accordingly, it is possible to reduce the possibility that an occupant feels discomfort due to a change in drive power caused by changes in the operating states of the engine and the motor.

In the hybrid vehicle according to the above-described aspect of the invention, the travel pattern setting portion may set the travel pattern based on road gradient data. The information on the actual road condition may be an actual road gradient.

The road gradient is the most influential among factors that change the operating states of the engine and the motor in the hybrid vehicle. On a road with an upward gradient, drive power generated by the engine is required. On a road with a downward gradient, regenerative electric power may be generated by the motor. Accordingly, in the hybrid vehicle, the travel pattern setting portion sets the travel pattern on the route to the destination, based on the map data (particularly the road gradient). The operation schedule setting portion sets the operation schedule based on the travel pattern. When the hybrid vehicle is traveling, the road condition acquisition portion acquires the actual road gradient, and the control portion controls the operations of the engine and the motor based on the operation schedule set based on the road gradient data and the actual road gradient. Thus, in the hybrid vehicle, the operating states of the engine and the motor are changed while the operation schedule set based on the road gradient data is compared with the actual road gradient. Therefore, it is possible to change the operating states of the engine and the motor according to a change in the actual road gradient. Accordingly, it is possible to reduce the possibility that the occupant feels discomfort due to a change in the drive power caused by changes in the operating states of the engine and the motor at a point at which the road gradient changes.

In the hybrid vehicle according to the above-described aspect, the control portion may determine whether the hybrid vehicle is located near an operating state change point at which operating states of the engine and the motor are to be changed in the operation schedule; if the control portion determines that the hybrid vehicle is located near the operating state change point, the control portion may determine whether a change in the actual road gradient is equal to or larger than a threshold; and if the control portion determines that the change in the actual road gradient is equal to or larger than the threshold, the control portion may change the operating states of the engine and the motor according to the operation schedule.

In the hybrid vehicle according to the above-described aspect, the operation schedule may be a schedule for changing a ratio between the drive power generated by the engine and the drive power generated by the motor.

The hybrid vehicle travels while the ratio between the drive power generated by the engine and the drive power generated by the motor is changed according to the condition. In the hybrid vehicle, the operation schedule setting portion sets the operation schedule that is a schedule of changes in the ratio between the drive power generated by the engine and the drive power generated by the motor, based on the travel pattern. Accordingly, in the hybrid vehicle, the ratio between the drive power generated by the engine and the drive power generated by the motor is changed while the operation schedule set based on the map data is compared with the actual road condition. Therefore, it is possible to change the ratio between the drive power generated by the engine and the drive power generated by the motor, according to the actual road condition. Accordingly, it is possible to reduce the possibility that the occupant feels discomfort due to a change in the drive power caused by a change in the ratio between the drive power generated by the engine and the drive power generated by the motor.

In the hybrid vehicle according to the above-described aspect, the operation schedule may be a schedule for switching a travel mode between a hybrid vehicle travel mode and an electric vehicle travel mode.

The hybrid vehicle travels while a travel mode is switched between a hybrid vehicle travel mode (i.e., a mode in which the hybrid vehicle travels using the engine and the motor) and an electric vehicle travel mode (i.e., a mode in which the hybrid vehicle travels using only the motor). In the hybrid vehicle, the operation schedule setting portion sets the operation schedule that is a schedule of switching between the hybrid vehicle travel mode and the electric vehicle travel mode, based on the travel pattern. Accordingly, in the hybrid vehicle, the travel mode is switched between the hybrid vehicle travel mode and the electric vehicle travel mode while the operation schedule set based on the map data is compared with the actual road condition. Therefore, it is possible to switch the travel mode between the hybrid vehicle travel mode and the electric vehicle travel mode, according to the actual road condition. Accordingly, it is possible to reduce the possibility that the occupant feels discomfort due to a change in the drive power caused by switching of the travel mode between the hybrid vehicle travel mode and the electric vehicle travel mode.

The hybrid vehicle according to the above-described aspect of the invention may further include an electricity storage portion in which electricity is stored; and an electricity consumption schedule setting portion that sets an electricity consumption schedule that is a schedule relating to consumption and storage of the electricity in the electricity storage portion. The control portion may determine whether an actual amount of the electricity remaining in the electricity storage portion is different from a remaining electricity amount in the electricity consumption schedule by a value equal to or larger than a difference threshold while the hybrid vehicle is traveling on the route; and if the control portion determines that the actual amount of the electricity remaining in the electricity storage portion is different from the remaining electricity amount in the electricity consumption schedule by a value equal to or larger than the difference threshold, the control portion may modify the operation schedule and the electricity consumption schedule so that the available electricity in the electricity storage portion is used up at the destination.

A second aspect of the invention relates to a method of controlling a hybrid vehicle that includes an engine and a motor that generate drive power for driving the hybrid vehicle; and a storage portion in which road data is stored. The method includes acquiring information on an actual road condition; setting a route to a destination, based on the road data stored in the storage portion; setting a travel pattern on the set route, based on the road data stored in the storage portion; setting an operation schedule that is a schedule of operations of the engine and the motor, based on the set travel pattern; and controlling the operations of the engine and the motor based on the acquired information on the actual road condition and the set operation schedule.

According to the above-described aspects of the invention, the operating states of the engine and the motor are changed while the operation schedule set based on the map data is compared with the actual road condition. Therefore, it is possible to change the operating states of the engine and the motor according to the actual road condition. Accordingly, it is possible to reduce the possibility that the occupant feels discomfort due to a change in the drive power caused by changes in the operating state of the engine and the motor.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIGS. 2A to 2D show examples of a travel schedule and a battery power consumption schedule according to the embodiment of the invention, FIG. 2A shows control sections on a route from a departure place to a destination, FIG. 2B shows the travel schedule and the battery power consumption schedule that are set at a time of departure, FIG. 2C shows the travel schedule and the battery power consumption schedule that are set when an actual consumption of electricity in batteries is smaller than an electricity consumption in the battery power consumption schedule while the hybrid vehicle is traveling on the route, and FIG. 2D shows the travel schedule and the battery power consumption schedule that are set when the actual consumption of the electricity in the batteries is larger than the electricity consumption in the battery power consumption schedule while the hybrid vehicle is traveling on the route;

DETAILED DESCRIPTION OF EMBODIMENTS

Hereinafter, a hybrid vehicle according to an embodiment of the invention will be described with reference to the drawings.

In the embodiment, the hybrid vehicle according to the invention is applied to a plug-in hybrid vehicle in which a coordinated control is executed using a navigation system. In the hybrid vehicle according to the embodiment, a travel mode is switched between an electric vehicle travel mode (hereinafter, referred to as "EV travel mode") and a hybrid vehicle travel mode (hereinafter, referred to as "HV travel mode"). The hybrid vehicle according to the embodiment includes two batteries, that is, a battery for the EV travel mode (i.e., a plug-in charged battery), and a battery for the HV travel mode. In the hybrid vehicle according to the embodiment, when a route to a destination is set in the navigation system, the travel mode is switched between the EV travel mode and the HV travel mode based on a travel schedule (that may be regarded as the operation schedule according to the invention) that is a schedule of switching between the EV travel mode and the HV travel mode on the route. Particularly, in the embodiment, a control, which switches the travel mode between the EV travel mode and the HV travel mode in the hybrid vehicle when the route to the destination is set in the navigation system, will be described in detail.

Figure 1:
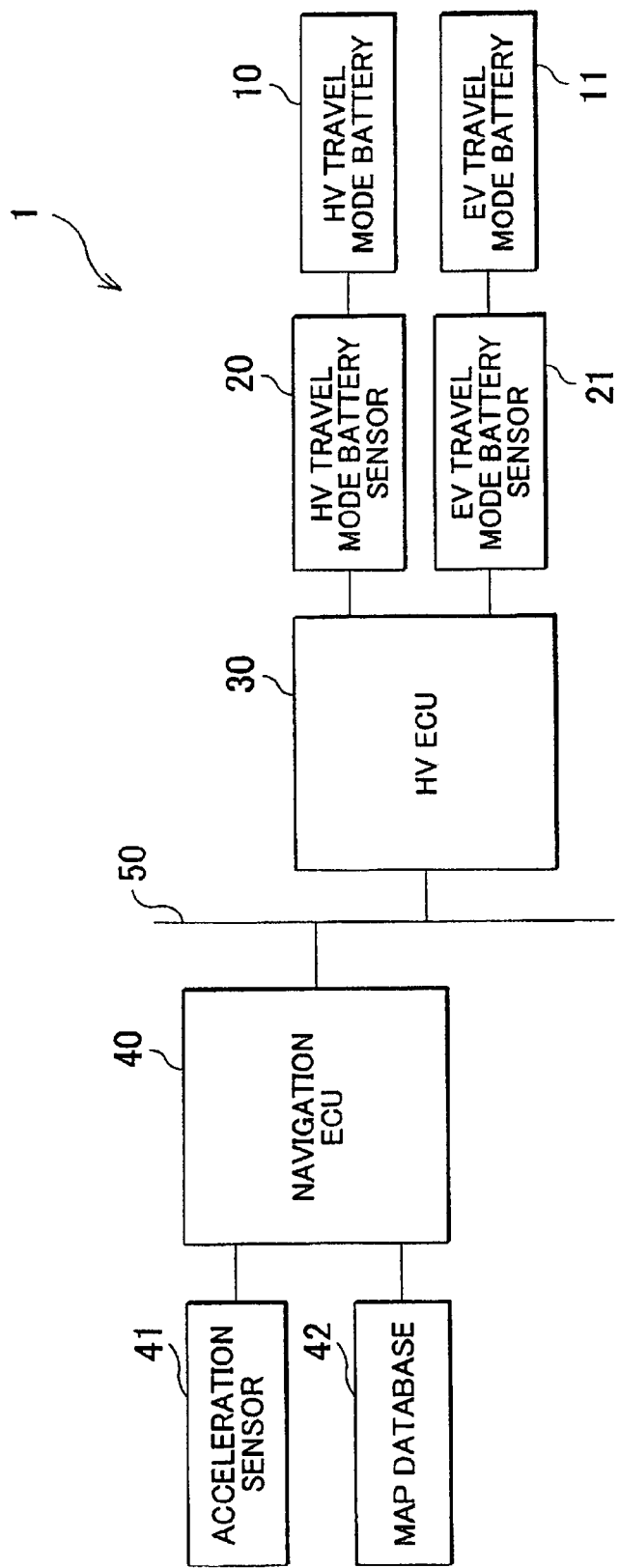
FIG. 1 is a configuration diagram showing a control apparatus of a hybrid vehicle according to an embodiment of the invention.
Figure 3A:
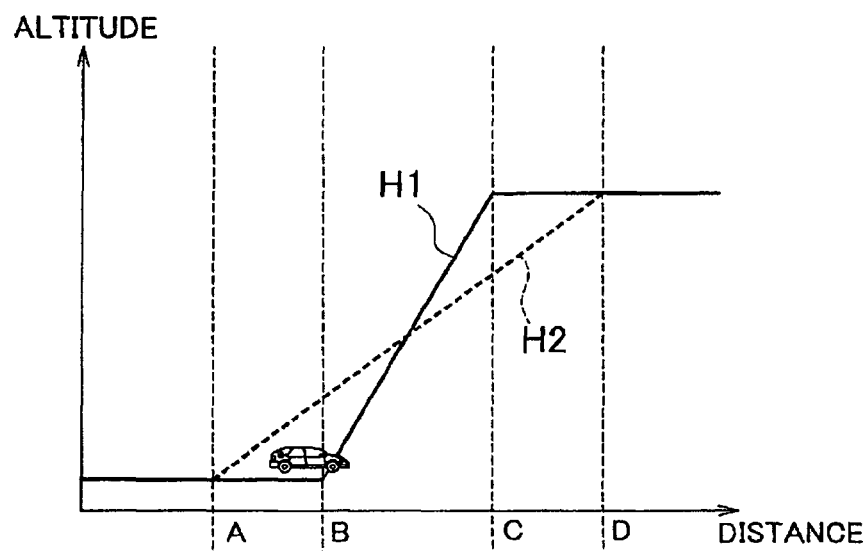
FIGS. 3A and 3B show an example of timings at which a travel mode is switched between an EV travel mode and an HV travel mode in accordance with gradient change points set based on map data, and an example of changes in output power due to the switching of the travel mode, and show an example of timings at which the travel mode is switched between the EV travel mode and the HV travel mode in accordance with gradient change points set based on sensor values, and an example of changes in the output power due to the switching of the travel mode.
Figure 3B:
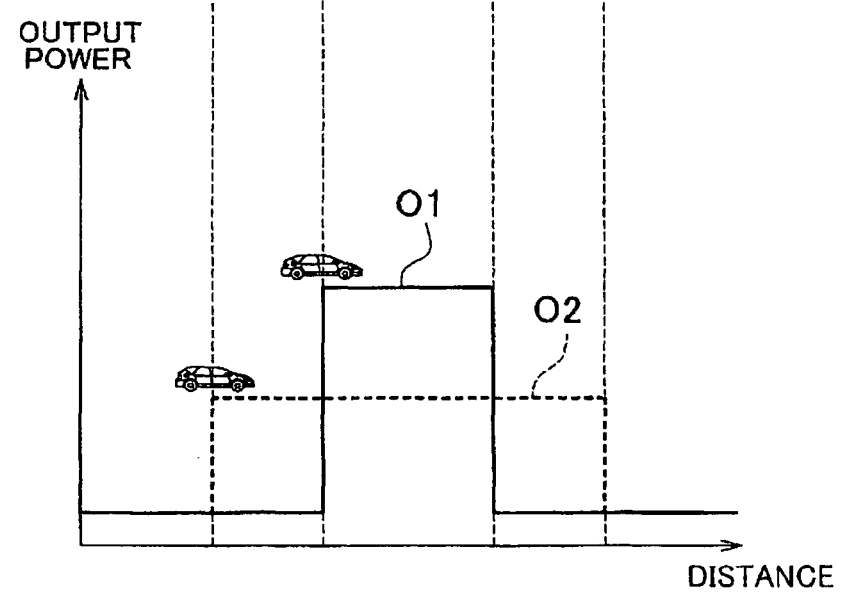

The hybrid vehicle according to the embodiment will be described with reference to FIG. 1 to FIGS. 3A and 3B. FIG. 1 is a configuration diagram showing a control apparatus of the hybrid vehicle according to the embodiment. FIGS. 2A to 2D show examples of a travel schedule and a battery power consumption schedule. More specifically, FIG. 2A shows control sections on a route from a departure place to a destination. FIG. 2B shows the travel schedule and the battery power consumption schedule that are set at the time of departure. FIG. 2C shows the travel schedule and the battery power consumption schedule that are set when an actual consumption of electricity in the batteries is smaller than an electricity consumption in the battery power consumption schedule while the hybrid vehicle is traveling on the route. FIG. 2D shows the travel schedule and the battery power consumption schedule that are set when the actual consumption of the electricity in the batteries is larger than the electricity consumption in the battery power consumption schedule while the hybrid vehicle is traveling on the route. FIGS. 3A and 3B show an example of timings at which the travel mode is switched between the EV travel mode and the HV travel mode in accordance with gradient change points set based on map data, and an example of changes in output power due to the switching of the travel mode, and show an example of timings at which the travel mode is switched between the EV travel mode and the HV travel mode in accordance with gradient change points set based on sensor values, and an example of changes in the output power due to the switching of the travel mode.

The hybrid vehicle includes an engine (not shown) and a motor (not shown). When the hybrid vehicle is in the EV travel mode, the engine is separated from the motor, and the hybrid vehicle travels using only the motor. When the hybrid vehicle is in the HV travel mode, the hybrid vehicle travels using the engine and the motor. In this case, the engine is a main drive power source, and the motor assists the engine.

In the case where the destination is set and the route to the destination is set in the navigation system, when the hybrid vehicle is stopped, a control apparatus 1 of the hybrid vehicle makes the travel schedule that is the schedule of switching between the EV travel mode and the HV travel mode on the route, and the control apparatus 1 makes the battery power consumption schedule that is a schedule relating to consumption and storage of electricity in the batteries so that all the available electricity in the batteries is used up at the destination. The battery power consumption schedule may be regarded as the electricity consumption schedule according to the invention. If the actual consumption of the electricity in the batteries is different from the electricity consumption in the battery power consumption schedule while the hybrid vehicle is traveling, the control apparatus 1 modifies the travel schedule and the battery power consumption schedule so that all the available electricity in the batteries is used up at the destination. Also, while the hybrid vehicle is traveling, the control apparatus 1 senses an actual gradient of a road. When the hybrid vehicle is located near a travel mode switching point at which the travel mode is to be switched in the travel schedule, the control apparatus 1 switches the travel mode in accordance with an actual gradient change point at which the actual gradient changes. The travel mode switching point may be regarded as the operating state change point according to the invention.

The configuration of the control apparatus 1 (particularly, the configuration relating to the control that switches the travel mode between the EV travel mode and the HV travel mode) will be described. The control apparatus 1 includes a battery 10 for the HV travel mode (hereinafter, referred to as "HV travel mode battery 10"); a battery 11 for the EV travel mode (hereinafter, referred to as "EV travel mode battery 11"); a battery sensor 20 for the HV travel mode (hereinafter, referred to as "HV travel mode battery sensor 20"); a battery sensor 21 for the EV travel mode (hereinafter, referred to as "EV travel mode battery sensor 21"); an HV Electronic Control Unit (ECU) 30; a navigation ECU 40 for the navigation system; an acceleration sensor 41; and a map database 42. The HV ECU 30 communicates with the navigation ECU 40 via a Controller Area Network (CAN) 50. The HV travel mode battery 10 and the EV travel mode battery 11 may be regarded as the electricity storage portion according to the invention.

In the embodiment, processes executed by the HV ECU 30 may be regarded as the travel pattern setting portion, the operation schedule setting portion, the control portion, and the electricity consumption schedule setting portion according to the invention. Processes executed by the navigation ECU 40 may be regarded as the route setting portion according to the invention. The acceleration sensor 41 and processes executed by the navigation ECU 40 may be regarded as the road condition acquisition portion according to the invention. The map database 42 may be regarded as the storage portion according to the invention.

The HV travel mode battery 10 is used when the hybrid vehicle is in the HV travel mode. The HV travel mode battery 10 is charged with regenerative electric power generated by the motor. A lower limit of the available electricity in the HV travel mode battery 10 is set. Thus, the amount of electricity remaining in the HV travel mode battery 10 is constantly equal to or higher than several tens of percent of the capacity of the HV travel mode battery 10. Accordingly, when the hybrid vehicle is in the HV travel mode, only a portion of the electricity in the HV travel mode battery 10 can be used.

The EV travel mode battery 11 is used when the hybrid vehicle is in the EV travel mode. The EV travel mode battery 11 is charged with regenerative electric power generated by the motor. In addition, the EV travel mode battery 11 is charged with electricity supplied from an external power source. There is no lower limit of the available electricity in the EV travel mode battery 11. Thus, the electricity in the EV travel mode battery 11 can be used until the amount of electricity remaining in the EV travel mode battery 11 is equal to 0% of the capacity of the EV travel mode battery 11. Accordingly, when the hybrid vehicle is in the EV travel mode, all the electricity in the EV travel mode battery 11 can be consumed.

The HV travel mode battery sensor 20 detects the amount of electricity stored in the HV travel mode battery 10 (i.e., the amount of electricity remaining in the HV travel mode battery 10). The HV travel mode battery sensor 20 detects the amount of electricity stored in the HV travel mode battery 10 and transmits the detected value to the HV ECU 30, at regular time intervals.

The EV travel mode battery sensor 21 detects the amount of electricity stored in the EV travel mode battery 11. The EV travel mode battery sensor 21 detects the amount of electricity stored in the EV travel mode battery 11 and transmits the detected value to the HV ECU 30, at regular time intervals.

The navigation ECU 40 is an electronic control unit that controls the navigation system. The navigation ECU 40 detects a current position of a host vehicle, and a direction in which the host vehicle travels, based on a GPS signal received from a GPS satellite, values detected by various sensors, and various map data stored in the map database 42, at regular time intervals. Also, the navigation ECU 40 calculates the actual gradient of a road based on longitudinal acceleration of the host vehicle, which is detected by the acceleration sensor 41, at regular time intervals. A conventional method is employed as the method of calculating the gradient. The navigation ECU 40 transmits information on the current position and information on the road gradient, to the HV ECU 30 at regular time intervals. The road gradient is expressed in terms of percent (%). The upward gradient is expressed by a positive value. The downward gradient is expressed by a negative value.

When the destination is set, the navigation ECU 40 calculates the route to the destination based on the various map data stored in the map database 42, and provides routing assistance so that the host vehicle travels along the route. The navigation ECU 40 transmits information on the route, to the HV ECU 30. The information on the route includes information on the gradient of each road on the route (i.e., information stored in the map database 42).

The HV ECU 30 is an electronic control unit that includes a Central Processing Unit (CPU), a Read Only Memory (ROM), and a Random Access Memory (RAM). In the HV ECU 30, application programs retained in the ROM are loaded into the RAM, and the application programs are executed by the CPU. Thus, the HV ECU 30 executes a schedule making process, a schedule modification process, a travel mode switching process, and the like. The HV ECU 30 receives information detected by the sensors 20 and 21, and receives various information from the navigation ECU 40.

The HV ECU 30 controls the engine and the motor by executing the processes based on the acquired information.

The schedule making process will be described. When the route to the destination is set in the navigation system while the vehicle is stopped, the HV ECU 30 determines whether the gradient of each road on the route is equal to or higher than an upward gradient determination threshold, and determines whether the gradient of each road is equal to or lower than a downward gradient determination threshold, based on the information on the route, which is acquired from the navigation ECU 40. The upward gradient determination threshold is used to determine whether the gradient is a relatively steep upward gradient. The upward gradient determination threshold is set to approximately a positive few percent. The downward gradient determination threshold is used to determine whether the gradient is a relatively steep downward gradient. The downward gradient determination threshold is set to approximately a negative few percent. The upward gradient determination threshold and the downward gradient determination threshold are set in advance, for example, empirically. For example, it may be determined whether an average gradient of the road is equal to or higher than the upward gradient determination threshold, and whether the average gradient of the road is equal to or lower than the downward gradient determination threshold. Also, it may be determined whether the gradient at each point in the road is equal to or higher than the upward gradient determination threshold, and whether the gradient at each point in the road is equal to or lower than the downward gradient determination threshold.

The HV ECU 30 designates a section with a gradient equal to or higher than the upward gradient determination threshold, as a prescribed upward gradient section (refer to FIG. 2A). The prescribed upward gradient section has a relatively steep upward gradient. Thus, in the prescribed upward gradient section, drive power generated by the engine is required. Also, the HV ECU 30 designates a section with a gradient equal to or lower than the downward gradient determination threshold, as a prescribed downward gradient section (refer to FIG. 2A). The prescribed downward gradient section has a relatively steep downward gradient. Thus, in the prescribed downward gradient section, the motor may generate regenerative electric power. Accordingly, in the prescribed downward gradient section, the electricity in the batteries is not consumed, and the batteries are charged with electricity.

The HV ECU 30 sets the control sections on the route, based on the prescribed upward gradient section(s) and the prescribed downward gradient section(s). The control sections are, for example, sections C1 to C8 shown in FIG. 2. Each boundary between the control sections is indicated by a dashed line in FIG. 2. The control sections include the prescribed upward gradient section(s), the prescribed downward gradient section(s), and the other control section(s). The travel schedule and the battery power consumption schedule are made based on the control sections. The control section other than the prescribed upward gradient section and the prescribed downward gradient section is a flat road or a road with a gentle gradient. The control section(s) designated as the prescribed upward gradient section(s), the control section(s) designated as the prescribed downward gradient section(s), and the other control section(s) may constitute a travel pattern. That is, the travel pattern is set based on road gradient data.

The HV ECU 30 sets the travel schedule for the route, based on the control sections. The travel schedule defines the section(s) in which the hybrid vehicle is to be in the HV travel mode, and the section(s) in which the hybrid vehicle is to be in the EV travel mode, on the route. That is, the travel schedule is the schedule of switching between the EV travel mode and the HV travel mode. In the travel schedule, basically, the travel mode is set to the HV travel mode in the control section(s) designated as the prescribed upward gradient section(s), and the travel mode is set to the EV travel mode in the control section(s) designated as the prescribed downward gradient section(s). In the other control section(s), the travel mode is set to one of the HV travel mode and the EV travel mode, taking into account that the available electricity in the batteries should be used up at the destination. However, exceptionally, if it is predicted that the available electricity in the batteries will not be used up at the destination, the travel mode is set to the EV travel mode even in the control section designated as the prescribed upward gradient section. If it is predicted that all the available electricity in the batteries will be consumed before the hybrid vehicle reaches the destination, the travel mode is set to the HV travel mode even in the control section designated as the prescribed downward gradient section.

The HV ECU 30 calculates the battery power consumption schedule so that the available electricity in the batteries is used up at the destination, based on the set travel schedule. The HV ECU 30 estimates the amount of electricity to be consumed in each control section in which the travel mode is set to the HV travel mode in the travel schedule, and estimates the amount of electricity to be consumed in each control section in which the travel mode is set to the EV travel mode in the travel schedule. The HV ECU 30 makes the battery power consumption schedule by subtracting the amount of electricity to be consumed in each control section, from the amount of the available electricity in the batteries. If it is predicted that the motor will generate regenerative electric power in the prescribed downward gradient section, the HV ECU 30 estimates the amount of regenerative electric power, and adds the amount of regenerative electric power. Thus, the battery power consumption schedule indicates the manner in which the electricity stored in the batteries will be consumed if the hybrid vehicle travels in the EV travel mode and the HV travel mode on the route according to the travel schedule.

The HV ECU 30 calculates the battery power consumption schedule based on the set travel schedule. However, if it is predicted that the available electricity in the batteries will not be used up at the destination, the HV ECU 30 resets the travel schedule by changing the travel mode to the EV travel mode in a portion of the control section(s) in which the travel mode has been set to the HV travel mode, in order to use up the available electricity in the batteries at the destination. Then, the HV ECU 30 recalculates the battery power consumption schedule based on the travel schedule. The HV ECU 30 calculates the battery power consumption schedule based on the set travel schedule. However, if it is predicted that all the available electricity in the batteries will be consumed before the hybrid vehicle reaches the destination, the HV ECU 30 resets the travel schedule by changing the travel mode to the HV travel mode in a portion of the control section(s) in which the travel mode has been set to the EV travel mode, in order to use up the available electricity in the batteries at the destination. Then, the HV ECU 30 recalculates the battery power consumption schedule based on the travel schedule. Thus, the HV ECU 30 makes the battery power consumption schedule and the travel schedule so that the available electricity in the batteries is used up at the destination.

The amount of the available electricity in the batteries is determined by determining a difference between the amount of electricity stored in the HV travel mode battery 10 detected by the HV travel mode battery sensor 20 at the time of departure, and the lower limit of the available electricity in the HV travel mode battery 10, and summing the difference and the amount of all the electricity stored in the EV travel mode battery 11 detected by the EV travel mode battery sensor 21. Accordingly, before calculating the battery power consumption schedule, the HV ECU 30 acquires the amount of electricity stored in the HV travel mode battery 10 from the HV travel mode battery sensor 20, acquires the amount of electricity stored in the EV travel mode battery 11 from the EV travel mode battery sensor 21, and calculates the total amount of the available electricity in the two batteries 10 and 11.

In the example shown in FIG. 2B, the travel mode is set to the EV travel mode in each of the control sections C1, C2, C3, C5, C7, and C8 in the travel schedule. The travel mode is set to the HV travel mode in each of the control sections C4 and C6 in the travel schedule. In the travel schedule, the travel mode is not set to the HV travel mode, and is set to the EV travel mode in the control section C2 designated as the prescribed upward gradient section, in order to use up the available electricity in the batteries at the destination. In the battery power consumption schedule, the amount of electricity remaining in the batteries is increased due to the regenerative operation of the motor, in each of the control sections C5 and C7 designated as the prescribed downward gradient sections. In each of the other control sections C1, C2, C3, C4, C6, and C8, the amount of electricity remaining in the batteries is decreased. The amount of electricity remaining in the batteries is equal to 0% of the amount of the available electricity in the batteries at the destination.

When the travel schedule and the battery power consumption schedule are set, the HV ECU 30 notifies a driver that a hybrid control is executed according to the travel schedule, using an audio output and/or a screen display.

The schedule modification process will be described. When the hybrid vehicle starts to travel, the HV ECU 30 acquires the amount of electricity stored in the HV travel mode battery 10 from the HV travel mode battery sensor 20, and acquires the amount of electricity stored in the EV travel mode battery 11 from the EV travel mode battery sensor 21, at regular time intervals. The HV ECU 30 calculates the total amount of electricity remaining in the two batteries 10 and 11 at each time point. Also, the HV ECU 30 acquires the information on the current position of the hybrid vehicle from the navigation ECU 40 at regular time intervals.

The HV ECU 30 compares a remaining electricity amount in the battery power consumption schedule with the actual amount of electricity remaining in the batteries 10 and 11 at the current position, and determines whether the difference therebetween is equal to or larger than the difference threshold, at regular time intervals. The difference threshold is used to determine whether the remaining electricity amount in the battery power consumption schedule is different from the actual amount of electricity remaining in the batteries. The difference threshold is set in advance, for example, empirically.

When the actual amount of electricity remaining in the batteries is larger than the remaining electricity amount in the battery power consumption schedule by a value equal to or larger than the difference threshold, it is predicted that the available electricity in the batteries will not be used up at the destination. Thus, fuel efficiency deteriorates. Accordingly, the HV ECU 30 modifies the travel schedule by changing the travel mode to the EV travel mode in a portion of the control section(s) in which the travel mode has been set to the HV travel mode. Then, the HV ECU 30 recalculates the battery power consumption schedule based on the travel schedule. In the example shown in FIG. 2C, at a point in the control section C5, an actual remaining electricity amount R1 is larger than a remaining electricity amount P in the battery power consumption schedule that is initially made (because the amount of regenerative electric power generated and stored is larger than estimated). Thus, it is predicted that the available electricity will not be used up at the destination, as shown by a chain line. Therefore, the HV ECU 30 modifies the travel schedule by changing the travel mode from the HV travel mode to the EV travel mode in an approximately half of the control section C6 designated as the prescribed upward gradient section. This increases the amount of consumed electricity.

When the remaining electricity amount in the battery power consumption schedule is larger than the actual amount of electricity remaining in the batteries by a value equal to or larger than the difference threshold, it is predicted that all the available electricity in the batteries will be consumed before the hybrid vehicle reaches the destination. Accordingly, the HV ECU 30 modifies the travel schedule by changing the travel mode to the HV travel mode in a portion of the control section(s) in which the travel mode has been set to the EV travel mode, in order to use up the available electricity in the batteries at the destination. Then, the HV ECU 30 recalculates the battery power consumption schedule based on the travel schedule. In the example shown in FIG. 2D, at a point in the control section C5, the remaining electricity amount P in the battery power consumption schedule is smaller than an actual remaining electricity amount R2 (because the electricity is consumed even in the section with the downward gradient). Thus, the electricity is used up in the control section C5. Therefore, the HV ECU 30 modifies the travel schedule by changing the travel mode from the EV travel mode to the HV travel mode in a section that starts at a point in the control section C5 designated as the prescribed downward gradient section. This decreases the amount of consumed electricity.

The travel mode switching process will be described. The HV ECU 30 acquires the information on the current position of the hybrid vehicle and the information on the actual gradient, from the navigation ECU 40 at regular time intervals. Then, the HV ECU 30 determines whether the current position of the hybrid vehicle is near the travel mode switching point at which the travel mode is to be switched between the EV travel mode and the HV travel mode, based on the information on the current position and the travel schedule, at regular time intervals. It is determined whether the current position of the hybrid vehicle is near the travel mode switching point, by determining whether a difference between the travel mode switching point in the travel schedule and the current position of the hybrid vehicle detected by the navigation system is in a predetermined range. The predetermined range is set in advance based on, for example, accuracy of detecting the current position in the navigation system, and accuracy of the map data (particularly the accuracy of the gradient change point). As shown in the example in FIGS. 2A to 2D, the travel mode switching point at which the travel mode is to be switched between the EV travel mode and the HV travel mode is a point at which the gradient greatly changes (for example, a point between the prescribed upward gradient section and the prescribed downward gradient section, a point between the prescribed upward gradient section and a flat section, and a point between the prescribed downward gradient section and the flat section).

When the hybrid vehicle is located near the travel mode switching point at which the travel mode is to be switched between the EV travel mode and the HV travel mode, the HV ECU 30 determines whether an absolute value of a change in the actual gradient is equal to or larger than a gradient change point determination threshold, at regular time intervals. The gradient change point determination threshold is used to determine whether the hybrid vehicle is located at the actual gradient change point at which the gradient of the actual road changes. The gradient change point determination threshold is set based on the upward gradient determination threshold and the downward gradient determination threshold.

If the absolute value of the change in the actual gradient is equal to or larger than the gradient change point determination threshold, the HV ECU 30 switches the travel mode from the EV travel mode to the HV travel mode, or from the HV travel to the EV travel mode, according to the travel schedule. Then, when the travel mode is switched to the EV travel mode, the HV ECU 30 controls only the motor. When the travel mode is switched to the HV travel mode, the HV ECU 30 controls the engine and the motor.

In the example shown in FIGS. 3A and 3B, the gradient changes so that the flat section, the prescribed upward gradient section, and the flat section are arranged in the stated order on the route. In the travel schedule, the travel mode is set to the EV travel mode in the flat section, the travel mode is set to the HV travel mode in the prescribed upward gradient section, and the travel mode is set to the EV travel mode in the flat section. FIG. 3A shows a change in an altitude (i.e., a change in the gradient). A solid line H1 indicates an actual altitude. A dashed line H2 indicates an altitude in the map data. FIG. 3B shows power output when the control is executed in each travel mode. More specifically, FIG. 3B shows the sum of the power output from the engine and the power output from the motor when the control is executed in the HV travel mode, and shows the power output from only the motor when the control is executed in the EV travel mode. A solid line O1 indicates a case where the travel mode is switched at the actual gradient change point at which the actual gradient changes. A dashed line O2 indicates a case where the travel mode is switched according to the travel schedule (i.e., the map data).

In the travel schedule, the travel mode switching point is set based on the map data. Therefore, in the travel schedule, the travel mode switching point, at which the travel mode is to be switched from the EV travel mode to the HV travel mode, is a point A, and the travel mode switching point, at which the travel mode is to be switched from the HV travel mode to the EV travel mode, is a point D. Accordingly, if the travel mode is switched according to the travel schedule, the travel mode is switched to the HV travel mode at the point A, and the output power, which is larger than the output power generated in the EV travel mode, is generated at the point A, as shown by the dashed line O2. However, because the flat road extends from the point A to a point B, an occupant feels discomfort due to the large output power. Also, the hybrid vehicle continues to travel in the HV travel mode up to the point D. However, because the flat road extends from a point C, the occupant feels discomfort due to the large output power that continues to be generated up to the point D, as shown by the dashed line O2.

When the travel mode is switched based on the change in the actual gradient, the travel mode is switched to the HV travel mode at the point B. Thus, the output power, which is larger than the output power generated in the EV travel mode, is generated at the point B at which the gradient changes to the steep upward gradient as shown by the solid line O1. Therefore, the occupant does not feel discomfort due to the large output power. Also, because the travel mode is switched to the EV travel mode at the point C, the output power is decreased at the point C at which the road becomes flat as shown by the solid line O1. Accordingly, the occupant does not feel discomfort due to the decreased output power.

Figure 4A:
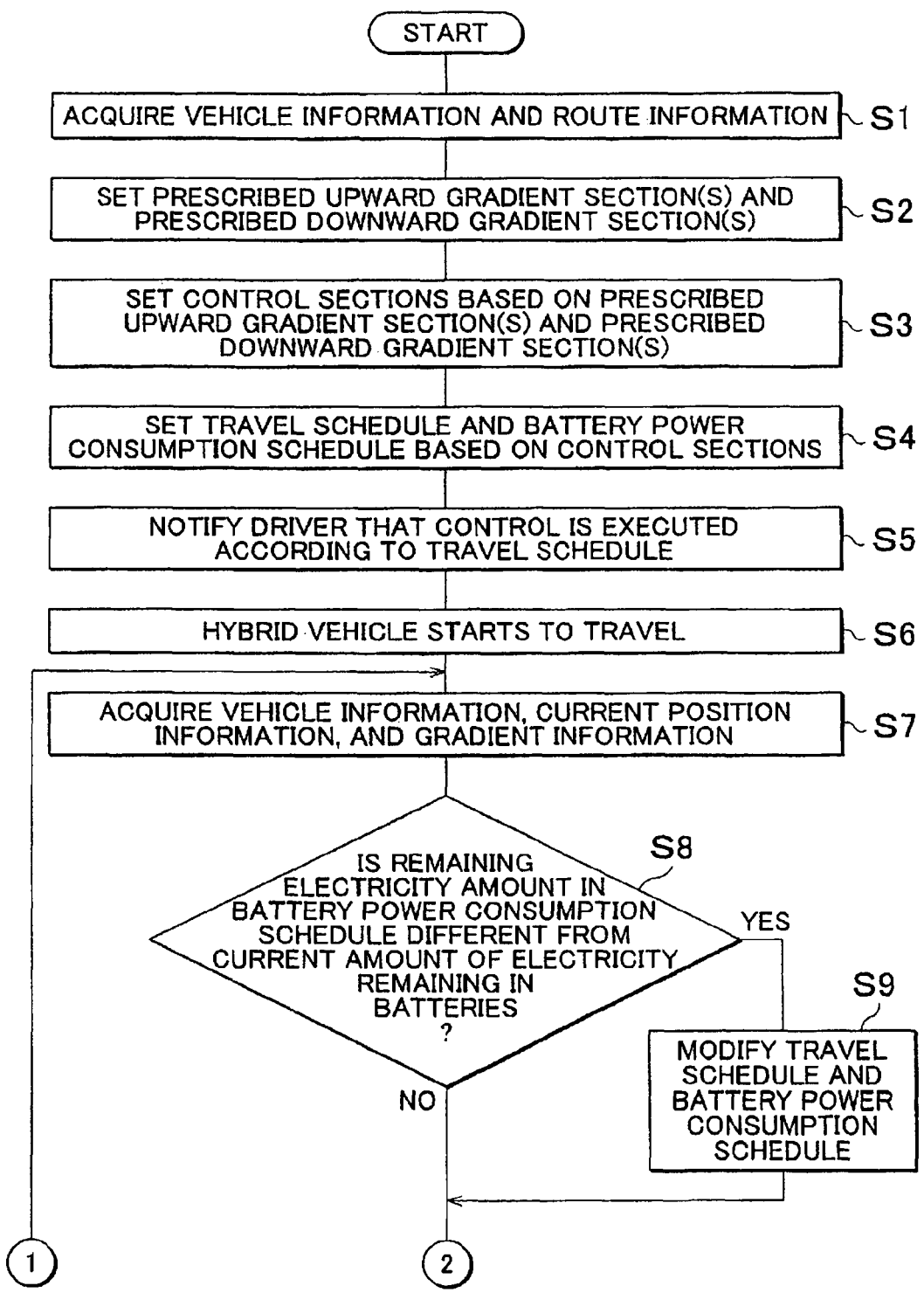
FIGS. 4A and 4B show a flowchart showing a flow of processes executed by an HV ECU in FIG. 1.
Figure 4B:
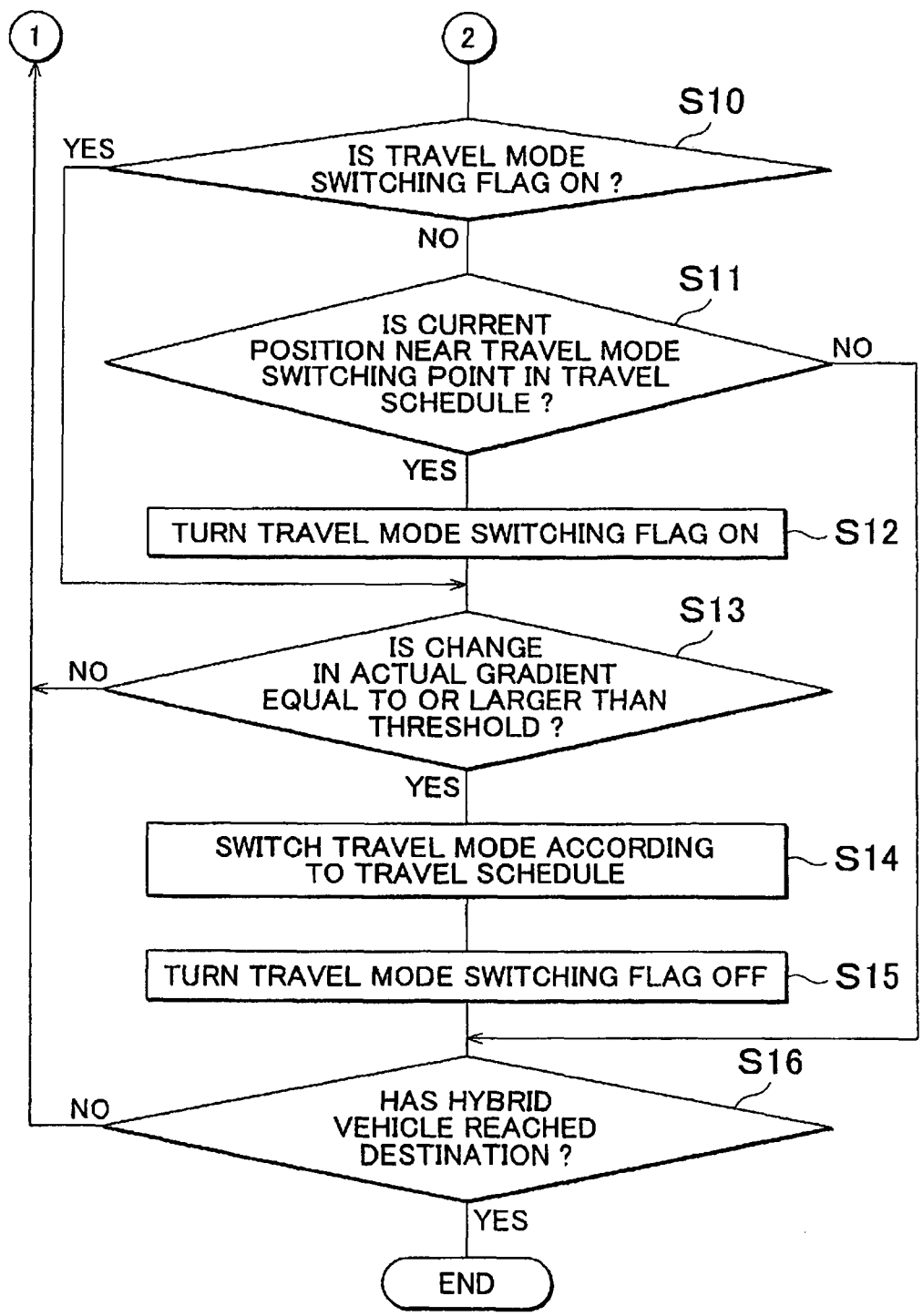

A flow of operation of the control, which is executed to switch the travel mode between the EV travel mode and the HV travel mode when the route to the destination is set in the navigation system, will be described with reference to FIG. 1 to FIGS. 3A and 3B. The control is executed by the control apparatus 1 of the hybrid vehicle. Particularly, the flow of the processes executed by the HV ECU 30 will be described with reference to a flowchart in FIGS. 4A and 4B. FIGS. 4A and 4B show the flowchart showing the flow of the processes executed by the HV ECU 30 in FIG. 1.

When the driver sets the destination while the hybrid vehicle is stopped, the navigation ECU 40 calculates the route to the destination based on various data stored in the map database 42, and transmits the information on the route (including the gradient information in the map data) to the HV ECU 30. The HV ECU 30 receives the information on the route (S1).

The HV travel mode battery sensor 20 detects the amount of electricity stored in the HV travel mode battery 10, and transmits the amount of the stored electricity to the HV ECU 30, at regular time intervals. Also, the EV travel mode battery sensor 21 detects the amount of electricity stored in the EV travel mode battery 11, and transmits the amount of the stored electricity to the HV ECU 30 at regular time intervals. The HV ECU 30 receives the amounts of electricity stored in the batteries 10 and 11 (i.e., the vehicle information) (S1).

The HV ECU 30 sets the prescribed upward gradient section(s) and the prescribed downward gradient section(s) on the route, based on the information on the gradient of each road on the route (i.e., the map data) (S2). Further, the HV ECU 30 sets the control sections on the route, based on the prescribed upward gradient section(s) and the prescribed downward gradient section(s) (S3). Then, the HV ECU 30 sets the travel schedule and the battery power consumption schedule based on the control sections so that the available electricity in the batteries is used up at the destination (S4). Then, the HV ECU 30 notifies the driver that the hybrid control is executed according to the set travel schedule (S5).

When the hybrid vehicle starts to travel (S6), the navigation ECU 40 detects the current position of the host vehicle and the direction in which the host vehicle travels, calculates the gradient of the road based on the longitudinal acceleration of the host vehicle detected by the acceleration sensor 41, and transmits the information on the current position and the information on the gradient to the HV ECU 30, at regular time intervals. The HV ECU 30 receives the information on the current position and the information on the gradient (S7). Also, as described above, the HV ECU 30 receives the amounts of electricity stored in the batteries 10 and 11 (i.e., the vehicle information) from the HV travel mode battery sensor 20 and the EV travel mode battery sensor 21, respectively (S7).

The HV ECU 30 determines whether the remaining electricity amount in the battery power consumption schedule is different from the actual amount of electricity remaining in the batteries at the current position, at regular time intervals (S8). If the HV ECU 30 determines that the remaining electricity amount in the battery power consumption schedule is different from the actual amount of electricity remaining in the batteries in step S8, the HV ECU 30 modifies the travel schedule and the battery consumption schedule so that the available electricity in the batteries is used up at the destination (S9).

If the HV ECU 30 determines that the remaining electricity amount in the battery power consumption schedule is not different from the actual amount of electricity remaining in the batteries in step S8, or if the schedules are modified in step S9, the HV ECU 30 determines whether a travel mode switching flag is ON (S10). If the HV ECU 30 determines that the travel mode switching flag is OFF in step S10, the HV ECU 30 determines whether the current position of the hybrid vehicle is near the travel mode switching point at which the travel mode is to be switched in the travel schedule (S11). If the HV ECU 30 determines that the current position of the hybrid vehicle is not near the travel mode switching point in step S11, the HV ECU 30 proceeds to a determination process in step S16.

If the HV ECU 30 determines that the current position of the hybrid vehicle is near the travel mode switching point, the HV ECU 30 turns the travel mode switching flag ON (S12). If the HV ECU 30 turns the travel mode switching flag ON in step S12, or if the HV ECU 30 determines that the travel mode switching flag is ON in step S10, the HV ECU 30 determines whether the change in the actual gradient is equal to or larger than the threshold (S13). If the HV ECU 30 determines that the change in the actual gradient is smaller than the threshold in step S13, the hybrid vehicle is not located at the actual gradient change point. Therefore, the HV ECU 30 returns to the process in step S7.

If the HV ECU 30 determines that the change in the actual gradient is equal to or larger than the threshold in step S13, the hybrid vehicle is located at the actual gradient change point. Therefore, the HV ECU 30 switches the travel mode to the EV travel mode or the HV travel mode according to the travel schedule, and executes the hybrid control according to the EV travel mode or the HV travel mode to which the travel mode has been switched (S14). Then, the HV ECU 30 turns the travel mode switching flag OFF (S15).

The HV ECU 30 determines whether the hybrid vehicle has reached the destination (S16). If the HV ECU 30 determines that the hybrid vehicle has not reached the destination in step S16, the HV ECU 30 returns to the process in step S7. If the HV ECU 30 determines that the hybrid vehicle has reached the destination in step S16, the HV ECU 30 ends the routine.

In the hybrid vehicle (particularly in the control apparatus 1), the battery power consumption schedule and the travel schedule relating to the switching of the travel mode between the EV travel mode and the HV travel mode are made so that the electricity in the batteries is used up at the destination, based on the information on the gradient of each road on the route. Thus, the electricity in the batteries is used up at the destination, the energy efficiency is improved, and the fuel efficiency is improved. Particularly in the hybrid vehicle, the travel mode is switched according to the change in the actual gradient. Therefore, it is possible to reduce the possibility that the occupant feels discomfort due to a change in drive power caused by the switching of the travel mode at the gradient change point.

Also, in the hybrid vehicle, if the manner, in which the electricity in the batteries is actually consumed, is different from the battery power consumption schedule, the battery power consumption schedule and the travel schedule are modified so that the electricity in the batteries is used up at the destination. Thus, the electricity in the batteries is reliably used up at the destination.

Also, in the hybrid vehicle, the driver is notified that the hybrid control is executed according to the travel schedule. Thus, it is possible to reduce the possibility that the occupant feels discomfort due to the control that is different from a normal control.

Although the embodiment of the invention has been described, the invention is not limited to the above-described embodiment, and the invention may be realized in various embodiments.

For example, although the invention is applied to the plug-in hybrid vehicle in the above-described embodiment, the invention may be applied to a hybrid vehicle that is not the plug-in hybrid vehicle.

Also, although the invention is applied to the hybrid vehicle that travels while the travel mode is switched between the EV travel mode and the HV travel mode, the invention may be applied to other hybrid vehicles. For example, the invention may be applied to a hybrid vehicle in which the ratio between drive power generated by an engine and drive power generated by a motor is changed, such as a parallel hybrid vehicle, or a hybrid vehicle in which switching between an engine and a motor is performed, such as a series hybrid vehicle. In the hybrid vehicle in which the ratio between the drive power generated by the engine and the drive power generate by the motor is changed, a travel schedule that is a schedule of changes in the ratio is made. In the hybrid vehicle in which the switching between the engine and the motor is performed, a travel schedule that is a schedule of switching between the engine and the motor is made.

Although the invention is applied to the hybrid vehicle that includes the plurality of batteries for the EV travel mode and the HV travel mode in the above-described embodiment, the invention may be applied to a hybrid vehicle that includes only one battery.

In the above-described embodiment, the battery power consumption schedule is made to consume 100% of the electricity in the EV travel mode battery, and consume the electricity in the HV travel mode battery to the lower limit. However, the battery power consumption schedule may be made only to consume 100% of the electricity in the EV travel mode battery.

In the above-described embodiment, the travel schedule and the battery power consumption schedule are made according to the gradient of each road, and the travel mode is switched between the EV travel mode and the HV travel mode according to the actual gradient of each road. However, the control may be executed based on another parameter relating to a road condition, which influences the switching between the EV travel mode and the HV travel mode. Also, a schedule may be made based on the output power. In this case, the travel mode is switched between the EV travel mode and the HV travel mode according to the actual output power.

Although the actual gradient of the road is acquired from the navigation ECU 40 in the above-described embodiment, the HV ECU 30 may calculate the gradient based on the longitudinal acceleration, or a gradient sensor or the like may be used.

The invention claimed is:

1. A hybrid vehicle that includes an engine and a motor that generate drive power for driving the hybrid vehicle, comprising:
   a road condition acquisition portion which is installed in the hybrid vehicle, and which acquires information on an actual road condition;
   a storage portion in which road data is stored;
   a route setting portion that sets a route to a destination, based on the road data stored in the storage portion;
   a travel pattern setting portion that sets a travel pattern on the route set by the route setting portion, based on the road data stored in the storage portion;
   an operation schedule setting portion that sets an operation schedule that is a schedule of operations of the engine and the motor, based on the travel pattern set by the travel pattern setting portion; and
   a control portion that controls the operations of the engine and the motor based on the information on the actual road condition acquired by the road condition acquisition portion and the operation schedule set by the operation schedule setting portion, wherein the information on the actual road condition is an actual road gradient;
   the control portion determines whether the hybrid vehicle is located near an operating state change point at which operating states of the engine and the motor are to be changed in the operation schedule;
   if the control portion determines that the hybrid vehicle is located near the operating state change point, the control portion determines whether the gradient of the actual road changes; and
   if the control portion determines that the gradient of the actual road changes, the control portion changes the operating states of the engine and the motor according to the operation schedule, and if the control portion does not determine that the gradient of the actual road changes, the control portion does not change the operating states of the engine and the motor, the operating states being set by the operation schedule.

2. The hybrid vehicle according to claim 1, wherein the travel pattern setting portion sets the travel pattern based on road gradient data.

3. The hybrid vehicle according to claim 1, wherein the operation schedule is a schedule for changing a ratio between the drive power generated by the engine and the drive power generated by the motor.

4. The hybrid vehicle according to claim 1, wherein the operation schedule is a schedule for switching a travel mode between a hybrid vehicle travel mode and an electric vehicle travel mode.

5. The hybrid vehicle according to claim 1, further comprising:
   an electricity storage portion in which electricity is stored; and
   an electricity consumption schedule setting portion that sets an electricity consumption schedule that is a schedule relating to consumption and storage of the electricity in the electricity storage portion, wherein
   the control portion determines whether an actual amount of the electricity remaining in the electricity storage portion is different from a remaining electricity amount in the electricity consumption schedule by a value equal to or larger than a difference threshold while the hybrid vehicle is traveling on the route; and
   if the control portion determines that the actual amount of the electricity remaining in the electricity storage portion is different from the remaining electricity amount in the electricity consumption schedule by a value equal to or larger than the difference threshold, the control portion modifies the operation schedule and the electricity consumption schedule so that the available electricity in the electricity storage portion is used up at the destination.

6. A method of controlling a hybrid vehicle that includes an engine and a motor that generate drive power for driving the hybrid vehicle; and a storage portion in which road data is stored, the method comprising:
   acquiring information on an actual road condition;
   setting a route to a destination, based on the road data stored in the storage portion;
   setting a travel pattern on the set route, based on the road data stored in the storage portion;

setting an operation schedule that is a schedule of operations of the engine and the motor, based on the set travel pattern; and controlling the operations of the engine and the motor based on the acquired information on the actual road condition and the set operation schedule, wherein the information on the actual road condition is an actual road gradient, the method further comprising:

determining whether the hybrid vehicle is located near an operating state change point at which operating states of the engine and the motor are to be changed in the operation schedule;

determining whether the gradient of the actual road changes if it is determined that the hybrid vehicle is located near the operating state change point; and changing the operating states of the engine and the motor according to the operation schedule if it is determined that the gradient of the actual road changes, and if it is not determined that the gradient of the actual road changes, the operating states of the engine and the motor do not change, the operating states being set by the operation schedule.

7. The method according to claim 6, wherein
the travel pattern is set based on road gradient data.

8. The method according to claim 6, wherein
the operation schedule is a schedule for changing a ratio between the drive power generated by the engine and the drive power generated by the motor.

9. The method according to claim 6, wherein
the operation schedule is a schedule for switching a travel mode between a hybrid vehicle travel mode and an electric vehicle travel mode.

10. The method according to claim 6, wherein
the hybrid vehicle further includes an electricity storage portion in which electricity is stored; and the method further comprises:

setting an electricity consumption schedule that is a schedule relating to consumption and storage of the electricity in the electricity storage portion;

determining whether an actual amount of the electricity remaining in the electricity storage portion is different from a remaining electricity amount in the electricity consumption schedule by a value equal to or larger than a difference threshold while the hybrid vehicle is traveling on the route; and modifying the operation schedule and the electricity consumption schedule so that the available electricity in the electricity storage portion is used up at the destination if it is determined that the actual amount of the electricity remaining in the electricity storage portion is different from the remaining electricity amount in the electricity consumption schedule by a value equal to or larger than the difference threshold.

* * * * *